J. MacKAYE.
PEAT DELIVERING APPARATUS.
APPLICATION FILED MAR. 20, 1911.

1,053,191.

Patented Feb. 18, 1913.
6 SHEETS—SHEET 1.

Fig. 1.

Witnesses
H. B. Davis
G. H. Cushman

Inventor
James MacKaye
by Noyes & Harriman
attys.

J. MacKAYE.
PEAT DELIVERING APPARATUS.
APPLICATION FILED MAR. 20, 1911.

1,053,191.

Patented Feb. 18, 1913.
6 SHEETS—SHEET 6.

WITNESSES:
H. B. Davis.
G. H. Cushman

INVENTOR:
James MacKaye

UNITED STATES PATENT OFFICE.

JAMES MacKAYE, OF CAMBRIDGE, MASSACHUSETTS.

PEAT-DELIVERING APPARATUS.

1,053,191. Specification of Letters Patent. Patented Feb. 18, 1913.

Application filed March 20, 1911. Serial No. 615,577.

*To all whom it may concern:*

Be it known that I, JAMES MACKAYE, a citizen of the United States, residing at Cambridge, in the county of Middlesex and State of Massachusetts, have invented an Improvement in Peat-Delivering Apparatus, of which the following is a specification.

This invention relates to a car for transporting peat to and depositing it on a drying-field for the purpose of drying the same.

The problem of converting peat into fuel is primarily the problem of eliminating the contained water, on a large scale, economically; and the car embodying this invention is designed to assist in solving this problem. The car embodying this invention is designed to be propelled to a peat-supply, which may be a bog, where it will be filled with wet peat, which has been previously macerated by a suitable mixer, or otherwise made ready to be delivered to and deposited upon the drying-field. It is then propelled to the drying-field, which may or may not be a specially prepared field, and when there the wet peat is automatically delivered upon the field in the form of blocks suitable for fuel, as the car advances, said blocks being delivered at a good rate of speed and in a position best suited for quick drying, and economy of space on the field. The car may be propelled in any direction over any ordinary field, without the aid of rails, so that the course pursued by the operator in going to and from the peat-supply and in passing over the field may be according to his judgment. By the car embodying this invention no human labor except to steer the car and determine the points of beginning and of ending the delivering operation is usually required, until the peat is dry and ready to gather.

The invention has for its object to construct a car with a large peat-carrying capacity, and with suitable propelling-means and steering-means, and also with power-actuated means to automatically deliver the wet peat in the form of blocks, in successive rows, as the car advances; to provide the block-forming means with a continuous supply of wet peat from the hopper and to operatively connect the block-forming means with the propelling-means for the car, whereby blocks are automatically produced as the machine advances which are of a predetermined size according to the distance traveled by the machine regardless of its speed; to construct and arrange the block-delivering-means whereby the blocks are elongated in form and are deposited on the field on end, to thereby expose to the air as large a surface as possible, and at the same time to occupy but little space on the field, so that on a field of a given area a large number of blocks may be arranged to dry; to utilize plungers and dies in forming the blocks, as plungers can be mechanically operated easily and quickly; to provide means to doff or detach the blocks from the ends of the plungers, so that they will be uniform in shape and size and the full capacity of the plungers obtained, for without such provision the blocks would usually stick to the ends of the plungers and fragmentary portions only, such as might drop by gravity, would be delivered; to provide means especially adapted to feed the wet peat into the path of movement of the plungers, so that each plunger, upon each operation, will do its full duty.

The apparatus hereinafter described is practically operative, but many changes and improvements in detail of construction are possible without in any way departing from my invention.

In the embodiment of my invention here shown, for purposes of illustration, A represents a car-body or receptacle, of large capacity, supported on a platform, A', mounted on trucks $A^2$, $A^3$, bearing caterpillar-wheels $A^4$ of any usual or suitable construction, or other form of traction-wheels. There may be two rear trucks $A^2$, see dotted lines Fig. 2, arranged in parallel and rigidly attached to the platform, and one front truck $A^3$ connected to the platform by a swivel $a$, fixed to a large gear $a'$, which is engaged by a pinion $a^2$, secured to the shaft $a^3$ of a steering-wheel. The car, thus provided with propelling-means, may be moved about over a field, and to and from the peat-supply, but my invention is also applicable to a car fitted to run on a railway or having other propelling-means.

In the car here shown a gasolene engine B is employed as the motor, but my invention includes other means of propulsion. Its shaft $b$ is arranged in suitable bearings $b'$ on the platform, and said shaft $b$ serves as the power-shaft, and will be so considered even though driven by any other form of motor. The shaft $b$ ordinarily is driven at a high speed.

Figure 1:
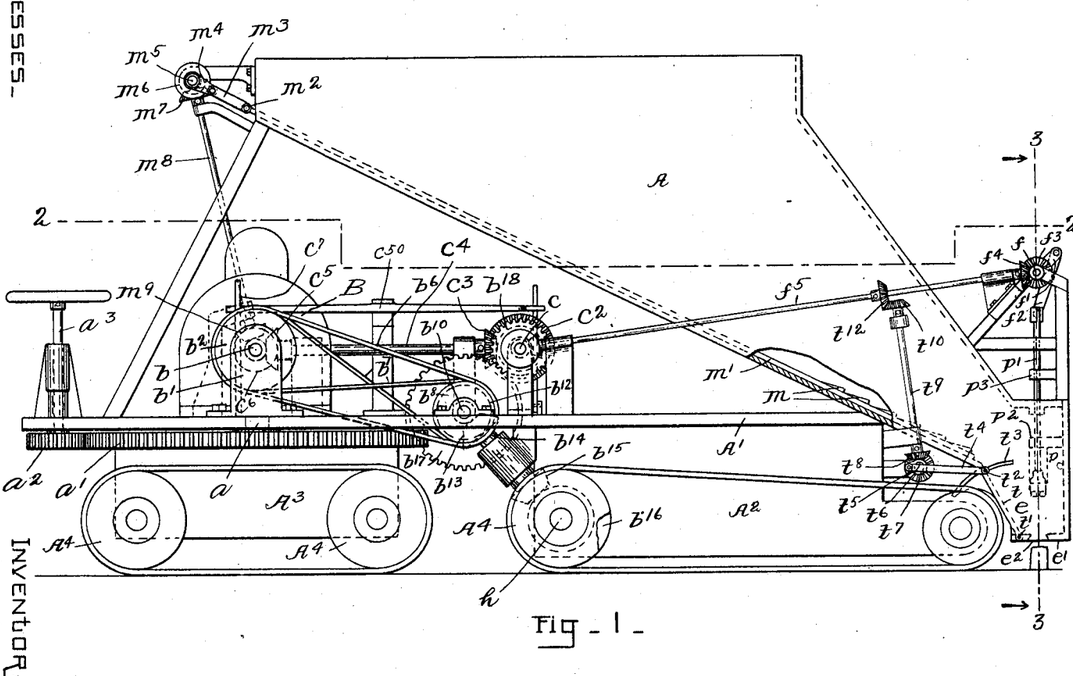
Figure 1 is a side elevation of a peat-delivering apparatus embodying this invention.
Figure 2:
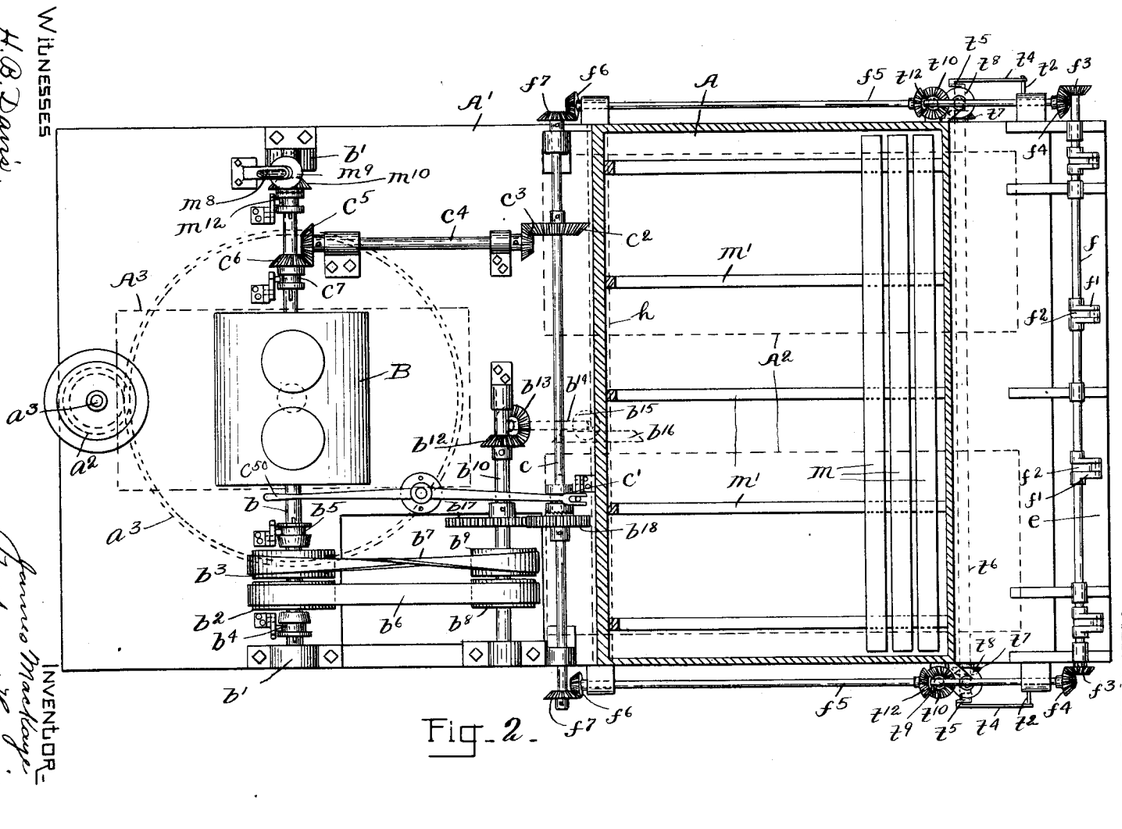
Fig. 2 is a horizontal section of the apparatus shown in Fig. 1, taken on the dotted line 2—2.

It is herein designed to propel the car at a comparatively rapid rate of speed forward and backward, as for instance, when going to and from the peat-supply or moving about from place to place, and to propel the car at a slow rate of speed when moving over the drying-field and depositing thereon the wet peat. In carrying out this part of my invention means are arranged between the power shaft $b$ and the driving-axle $h$ adapted to be thrown into and out of action as desired. Referring to Figs. 1 and 2, two belt pulleys $b^2$ and $b^3$ are loosely mounted on the power-shaft $b$, which are separately adapted to be connected therewith, as by clutches $b^4$, $b^5$; and belts $b^6$, $b^7$, one of which as $b^7$ is crossed, pass from said pulleys around pulleys $b^8$, $b^9$, secured to a horizontal shaft $b^{10}$, suitably supported above the platform, and a bevel-gear $b^{12}$ is secured to said shaft $b^{10}$, which engages a bevel-gear $b^{13}$ secured to a downward, rearwardly extended shaft $b^{14}$, which has secured to it a small bevel-gear $b^{15}$, which engages a large bevel-gear $b^{16}$, secured to the driving-axle $h$. When the belt-pulley $b^2$ is connected with the power-shaft the axle $h$ is revolved in a forward direction and when the belt-pulley $b^3$ is connected with the power-shaft the axle $h$ is revolved in a backward direction, thus propelling the apparatus forward and backward and at a high rate of speed. When the apparatus is thus propelled, the other power-actuated mechanisms which are driven from the power-shaft $b$ are not connected with said shaft, and hence remain idle. The apparatus may thus be propelled to and from the peat-supply or moved about at will, with considerable speed. The intermediate shaft $b^{10}$ also has secured to it a spur-gear $b^{17}$ which is engaged by a smaller spur-gear $b^{18}$, loosely mounted on a horizontal shaft $c$, and which is adapted to be connected with said shaft by a clutch $c'$, and said shaft $c$ is herein the slow speed shaft and has secured to it a large bevel-gear $c^2$, which engages a small bevel-gear $c^3$ secured to a shaft $c^4$, having secured to it a bevel-gear $c^5$, which engages a bevel-gear $c^6$, mounted loosely on the power-shaft $b$ and adapted to be connected with said power-shaft by a clutch $c^7$. When the clutch $c'$ is operated to connect the spur-gear $b^{18}$ with the shaft $c$, and the clutch $c^7$ is operated to connect the bevel-gear $c^6$ with the power-shaft $b$ the intermediate shaft $b^{10}$ will be revolved and the axle $h$ in turn revolved in a forward direction, thus propelling the apparatus forward at a slow speed. The shaft $c$ is also employed to drive the peat-delivering means, as will be hereinafter described, so that when the apparatus is being propelled forward at a slow speed as above described the peat-delivering means will be operated.

The peat which is delivered by the machine embodying this invention is in a plastic condition. It has been previously pulverized by a machine and allowed to drain and stiffen somewhat, and has the properties of a very viscous liquid, and, owing to its viscosity will not usually flow through a hole of say less than twenty or thirty square inches in cross sectional area. In this condition it will hold its form, yet may be easily manipulated. This plastic peat is placed in the car-body or receptacle A, and said body has an inclined bottom, so that the mass of peat flows or moves downward, and the lower end of said body is formed as a compartment $e$, here termed the "plunger-box", into which the peat passes. Said plunger-box extends downward and terminates near the surface of the drying-field, and is preferably made the full width of the car-body. In its bottom wall $e'$ a row of orifices $e^2$ are formed, which serve as dies through which the peat is forced, said orifices being of such small area in cross-section that the peat will not flow through them readily without the pressure of the plungers. Above the row of dies $e^2$ a plunging-device, here shown as comprising a set of plungers, is arranged, which is vertically movable in the plunger-box. The plungers are of special construction on account of the particular work which they perform.

Referring to Figs. 3 to 9 inclusive, $p$ represents the head of one of the plungers, the others being like it, and said head is secured to a vertically arranged plunger-rod $p'$, passing through vertical holes in horizontal bars $p^2$, $p^3$, arranged one above the other and stationarily supported, and also through holes in the top of the plunger-box. The several plunger-rods $p$ are connected together at their upper ends by a cross-bar $p^4$, thus forming a plunger-frame, with each plunger-head disposed centrally above its corresponding die or die-opening. The plunger-frame is reciprocated vertically by a revolving shaft $f$, and, as here shown, said shaft has several double cranks $f$, connected by links $f^2$, with the cross-bar $p^4$, of said plunger-frame. The crank-motion thus provided for the plungers enables them to move up and down easily and quickly and to dwell for short periods of time at the upper and lower ends of the stroke and such motion is very effective for the purposes intended.

The shaft $f$ is operatively connected with the propelling-means for the apparatus, so as to operate conjunctively therewith, and, as here shown, said shaft $f$ has at each end a bevel-gear $f^3$ which is engaged by a bevel-gear $f^4$, secured to a shaft $f^5$, having thereon a bevel-gear $f^6$, which engages a bevel-gear $f^7$, secured to the shaft $c$. Thus, when said shaft $c$ is caused to revolve by being thrown into operative connection with the power-shaft $b$, and the propelling-means is being operated at a slow rate of speed, said shaft $f$ will be revolved. The shaft $f$ is revolved to move the plunger-frame with respect to the advancing movement of the car, so that the plungers will be operated to project blocks or sections of wet peat through the die-openings for delivery at uniform distances apart, although preferably quite near together, so as to occupy but little space on the drying-field.

Figure 3:
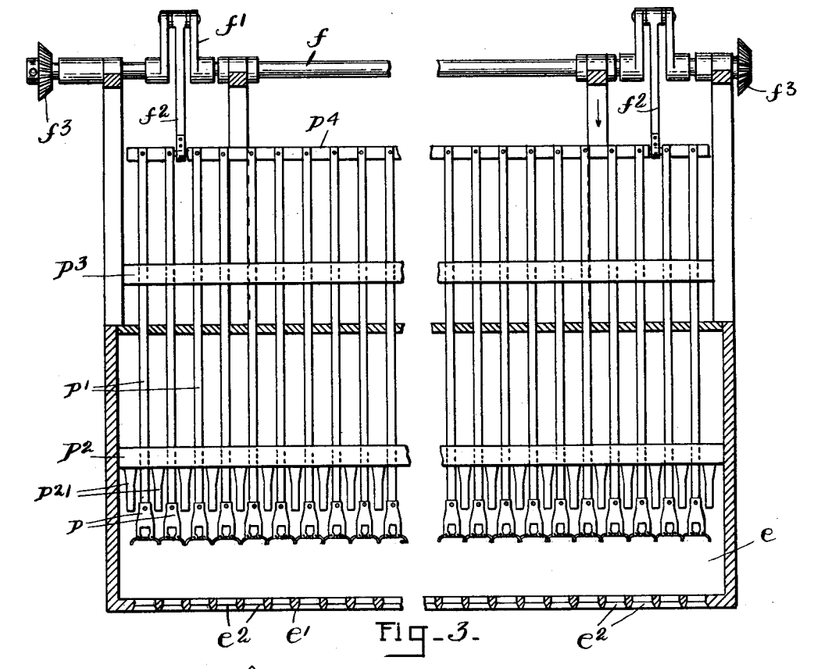
Fig. 3 is an enlarged vertical section of the apparatus shown in Fig. 1, taken on the dotted line 3—3.
Figure 4:
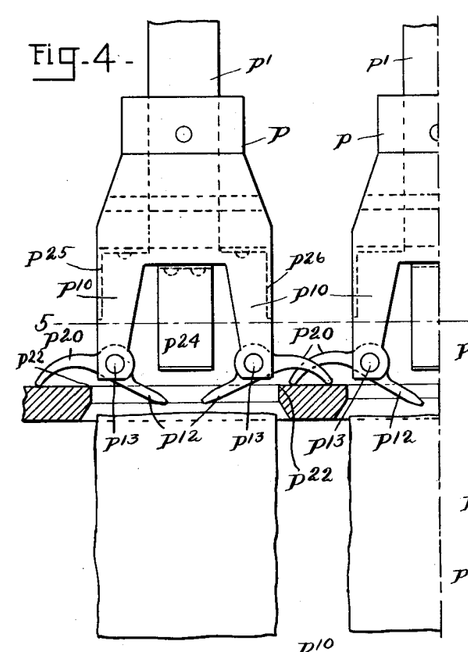
Fig. 4 is an enlarged rear elevation of a plunger-head in connection with the bottom wall of the plunger-box.
Figure 5:
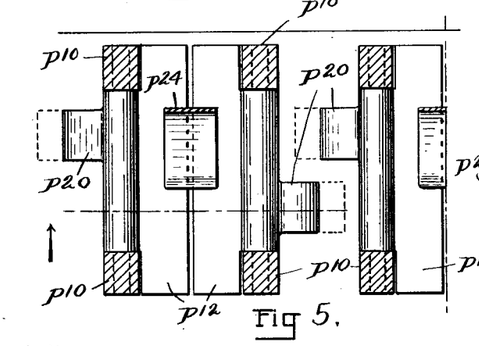
Fig. 5 is a horizontal section of the plunger-head taken on the dotted line 5—5, Fig. 4, the doffer-plates, however, being in horizontal position.
Figure 6:
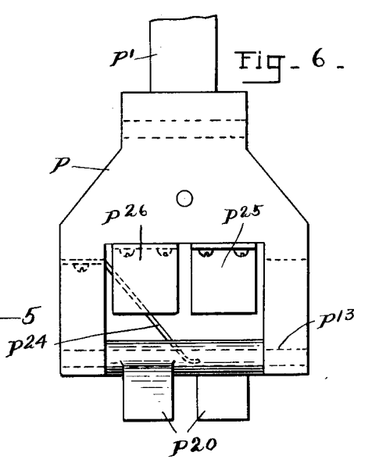
Fig. 6 is a side elevation of the plunger-head, the doffer-plates being in horizontal position.
Figure 7:
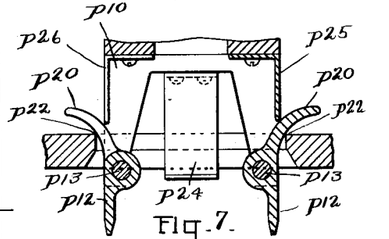
Fig. 7 is a sectional detail of the plunger-head, the doffer-plates being shown in vertical position, which position they will occupy when the plunger-head is at the lower end of its stroke.

When in the best condition for forming well shaped blocks the peat is very sticky, and if the plunger-heads are constructed like ordinary die-punches, the blocks will stick to them, and in such event only fragmentary portions thereof will ordinarily be deposited, causing an irregular and chaotic deposition, which is not only detrimental to rapid drying, but does not form a convenient and uniform fuel. To prevent the sticking of the blocks of peat to the plunger-heads, each plunger-head is provided with detaching-means or doffers especially designed to be operated to detach the peat-blocks. As shown in Figs. 4 to 9, each plunger-head has four downwardly extended projections $p^{10}$, arranged at the four corners of a quadrangular head, and at the extremities of said projections a pair of doffer-plates $p^{12}$, $p^{12}$, are provided, which, together are substantially coextensive with the area of the plunger-head, to thus normally close the space between said projections, and form a peat-engaging end portion on the plunger. Said doffer-plates are mounted loosely on horizontal pivot-shafts $p^{13}$, two in number, held by said projections. Said doffer-plates are free to be moved on their pivots from a horizontal to a vertical position, and vice versa, thus moving in a vertical plane, and their movements from a horizontal to a vertical position are employed to suddenly detach the block from the plunger-head, to snap it off, so to speak. In this way the top of the peat block is positively removed from the surface to which it is adhering, without giving it any other surface to attach itself to except the edges of the doffers which cannot hold it. The plungers work up and down in the peat in the plunger-box, and in the form here shown it is designed and intended that the doffer-plates shall occupy a horizontal position at the beginning of and during the down stroke, so as to move the peat below them and force it through the dies, and then to move into vertical position at the lower end of the down stroke to detach the peat blocks, and to remain in vertical position during the up-stroke until approaching the end thereof, when they are returned to horizontal position. To move said doffer-plates they are provided each with a curved arm $p^{20}$ extended outwardly from the plunger-head, said arms being here shown as having convex upper faces and concave under faces. From the stationary guide-bar $p^2$, abutments $p^{21}$ depend, which are arranged to be engaged by the convex faces of the arms $p^{20}$, as the plungers approach the upper ends of their up-strokes, and by engagement therewith the doffer-plates are turned on their pivots, moving from a vertical to a horizontal position. As each plunger-head is provided with two doffer-plates there will be two abutments $p^{21}$, for each plunger-head, but owing to the close proximity of the several plunger-heads the arms $p^{20}$ extending from the doffer-plates are staggered with respect to each other, so that a single abutment $p^{21}$ may be made wide enough to be engaged by the arms on the doffer-plates of two adjacent plungers, as shown in Figs. 3 and 9. The edges $p^{22}$ of the die-openings serve as abutments to be engaged by the under sides of the doffer-arms $p^{20}$, at the lower end of the down-stroke; to turn the doffer-plates on their pivots and move them from a horizontal to a vertical position, as shown in Fig. 7. As the plungers move rapidly, the doffer-plates will be moved suddenly with the result that the peat blocks will be quickly detached or snapped off, and fully and completely formed bricks will fall upon the drying-field. The distance they will fall will be short so that their shape will be preserved.

Figure 8:
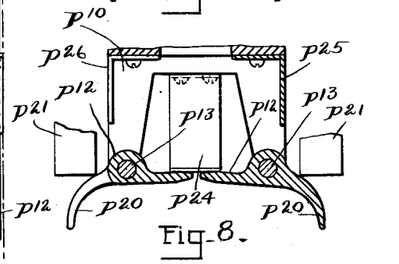
Fig. 8 is a similar detail of the plunger-head, the doffer-plates being shown in horizontal position, which position they will occupy when the plunger-head is at the upper end of its stroke.
Figure 9:
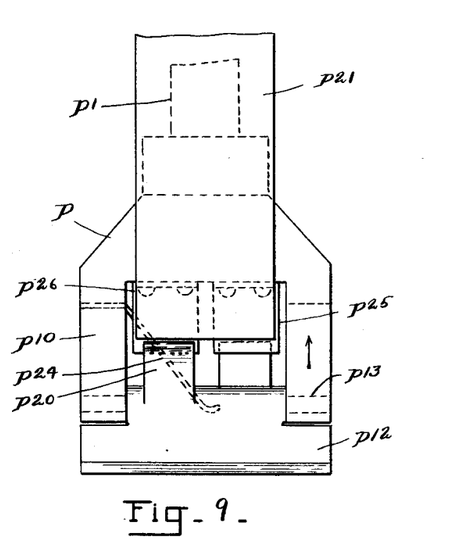
Fig. 9 is a side elevation of the plunger-head with the doffer-plates in vertical position and the abutment which is engaged by the doffer-plates to move them into horizontal position.

When the doffer-plates are moved into horizontal position they strike a yielding stop $p^{24}$, see Fig. 8, here shown as a flat spring attached at its upper end to a plunger-head, and its lower end being formed to be engaged by both plates of the pair, and when the doffer-plates are moved into vertical position, see Fig. 7, their arms $p^{20}$ will strike yielding stops $p^{25}$, $p^{26}$, which act to limit their movements, they yielding sufficiently to prevent breakage in case the parts should not be correctly adjusted. In face, these yielding stops $p^{25}$, $p^{26}$ will permit the arms to pass down into and through the die-openings if necessary.

Figure 15:
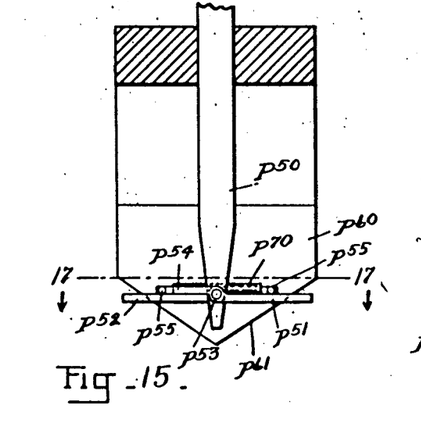
Figs. 15 to 19 are details of a modified form of doffer-plate which may be employed.
Figure 16:
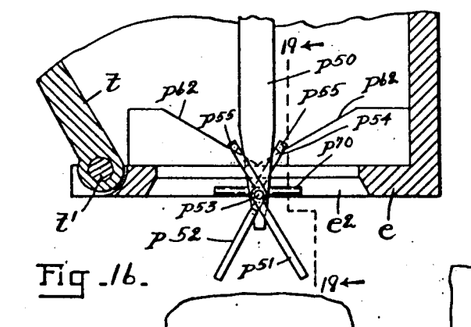
Figures 17, 18:
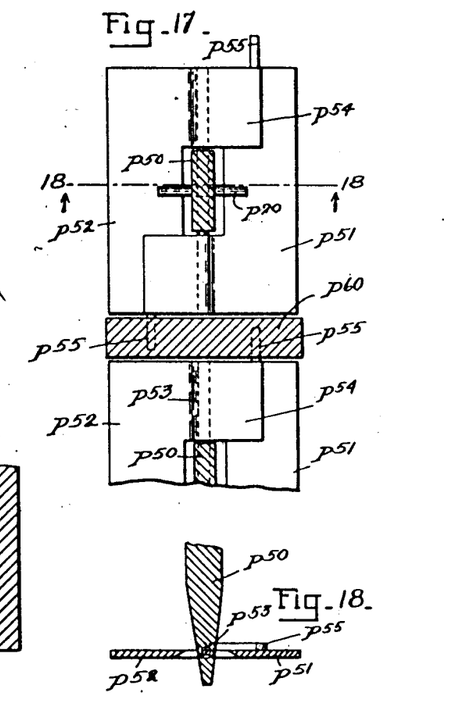
Figure 19:
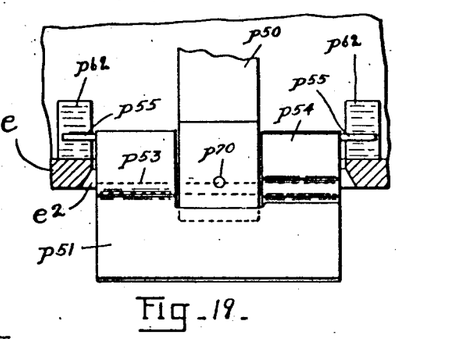

If desired the modified form of doffer-plates shown in Figs. 15 to 19 may be employed, wherein it will be seen that the plunger-rod is made longer than heretofore described, and is extended downward as at $p^{50}$, the plunger-head itself being omitted, and to the lower end portion of said rod $p^{50}$ a pair of plates $p^{51}$, $p^{52}$, are pivotally connected at $p^{53}$, each plate being coextensive with one-half of the die-opening, with which the plunger coöperates, so that the two plates when in horizontal position, as represented in Fig. 15, are substantially coextensive with the die-opening. Each plate $p^{51}$ and $p^{52}$ has a lateral extension $p^{54}$, at one end, which overlies a portion of the other plate when the two plates are in horizontal position, and each extension $p^{54}$ has an outwardly extended pin $p^{55}$ for engagement with abutments for the purpose of turning the plates on their pivots at the ends of the up and down strokes. At the end of the up-stroke of the plunger an abutment $p^{60}$, similar to the abutment $p^{21}$, may be provided, but having its lower end formed with inclined faces $p^{61}$ for the engagement therewith of the pins $p^{55}$, on the doffer-plates, to turn the doffer-plates into horizontal position. On the top of the bottom plate $e^2$ of the plunger-box, projections $p^{62}$, having inclined faces may be provided, see Fig. 16, which serve as abutments, for the engagement of the pins $p^{55}$ on the doffer-plates at the end of the down-stroke of the plunger to turn said doffer-plates in an approximately vertical position to detach the block or section of peat. In said Fig. 16 the plunger is represented in its lowermost position and an elongated block or section of peat is resting beneath it on the field, which has just been detached from the plunger. The lower end of the rod $p^{50}$ extends a short distance below the doffer-plates, to serve as a stop to limit the movement of the plates, and prevent them from moving into true vertical position, the movements permitted being sufficent to enable the doffer-plates to detach the block. A pin or pins $p^{70}$ are arranged on the rod $p^{50}$, just above the doffer-plates to prevent them from deflection when in operation.

Figure 10:
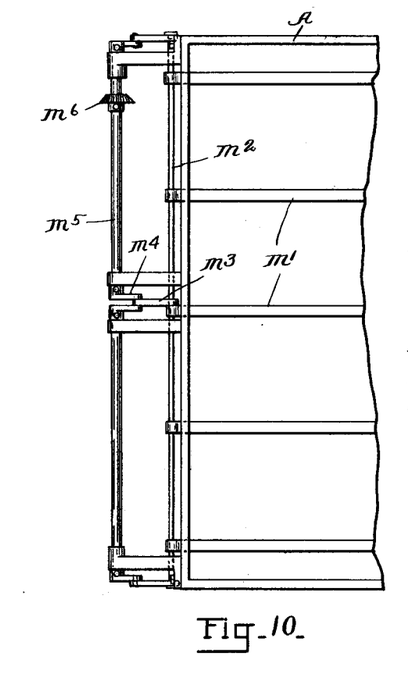
Fig. 10 is a detail of a portion of the upper feeding-device.
Figure 11:
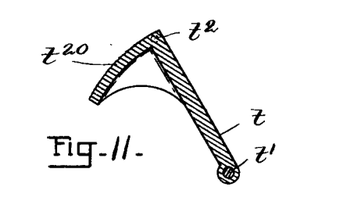
Figs. 11 to 14 inclusive are details of the lower feeding-device.
Figure 12:
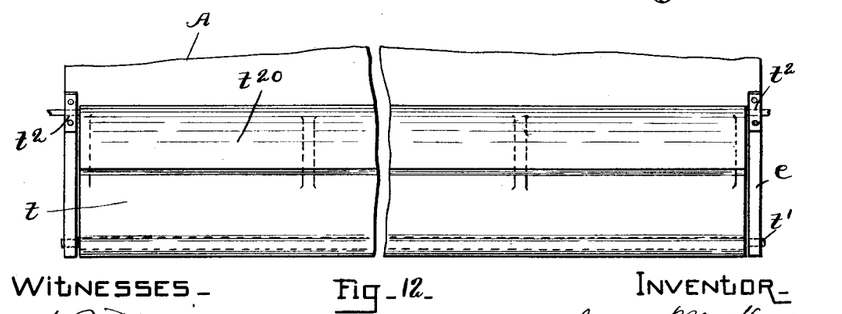
Figure 13:
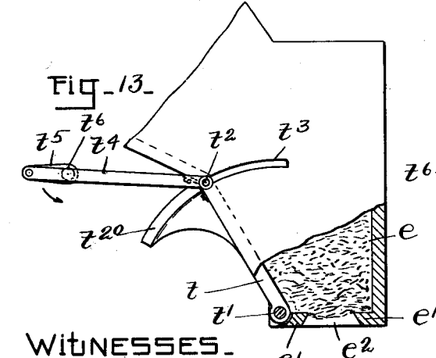
Figure 14:
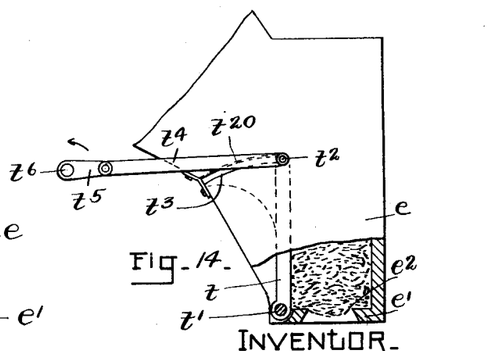

To cause the peat, which is quite stiff, to pass along the car-body or receptacle into the plunger-box $e$, and into the path of movement of the plungers, feeding-devices are employed. The feeding-device shown particularly in Figs. 2 and 10, is arranged on the inclined bottom of the car-body and terminates at or near the plunger-box $e$, and when operated acts to push the peat in a downward direction into the plunger-box. $m$ represents a set of cross-bars, triangular in cross-section, arranged in parallel relation crosswise the car-body, at the bottom thereof, and secured to a set of longitudinal bars $m'$, which rest on the inclined bottom of said body, and extend from the plunger-box or thereabout to the top of the car-body and through the upper end wall thereof. Outside of the car-body said longitudinal bars are connected to a cross-bar $m^2$, thus forming a frame adapted to work on the inclined bottom of the car-body. Said frame is reciprocated by power-actuated means, and, as here shown, the cross-bar $m^2$ is connected by links $m^3$ with double-cranks $m^4$ formed in a horizontal shaft $m^5$ supported at the top of the car-body. Said shaft has secured to it a bevel-gear $m^6$ which is engaged by a bevel-gear $m^7$ secured to an upright shaft $m^8$ having at its lower end a bevel-gear $m^9$ which engages a bevel-gear $m^{10}$ loosely mounted on the power-shaft $b$ and adapted to be connected therewith by a clutch $m^{12}$. When the clutch is thrown to connect said bevel-gear $m^{10}$ with the power-shaft the feeding-device thus described is reciprocated and the triangular cross-bars which are disposed with their larger ends at the rear, will repeatedly push the peat along the body and into the plunger-box. Another feeding-device may be employed, which is arranged in the plunger-box and below the aforesaid feeding-device, hence said aforesaid feeding-device may be termed the "upper feeding-device."

The plunger-box feeding-device or lower feeding-device, as it is arranged beneath the aforesaid feeding-device, as here shown, see Figs. 11 to 14, consists of a movable wall or board, extended lengthwise the plunger-box $a$, from end to end thereof or thereabout, and for simplicity of construction the side wall $t$ of the plunger-box may be utilized for this purpose, it being pivotally supported at its lower end, at $t'$, and movable on its pivots in a direction toward and from the plunger-heads, or in and out. In such case said wall has at its top an extension $t^{20}$, which is curved transversely. Normally, said wall occupies a position inclined to the left of a perpendicular, see Fig. 13, and is movable into vertical position, see Fig. 14, and such movement forces the peat in front of it, beneath the plunger-heads while the extension $t^{20}$ prevents the peat from passing down back of the wall. Said wall $t$ is arranged between the end walls of the plunger-box $e$, and has at its upper end or elsewhere, laterally extended pins $t^2$, which extend through and work in slots $t^3$ in said end walls, and said pins $t^2$ are connected by links $t^4$, to crank-arms $t^5$, secured to a horizontal shaft $t^6$, extended crosswise the apparatus. Said shaft $t^6$ has secured to it, at each end, bevel-gears $t^7$ which engage bevel-gears $t^8$ secured to the lower ends of shafts $t^9$, having at their upper ends bevel-gears $t^{10}$, which engage bevel-gears $t^{12}$ secured to the shafts $f^5$, at points intermediate their length, and as said shafts revolve said wall $t$ will be reciprocated. Other forms of feeding-devices may be employed in lieu of those here shown, or one or both feeding-devices may be omitted in case the condition of the peat is such as to admit of it.

It will be observed that all of the clutches $b^4$, $b^5$, $c^7$, and $m^{12}$ are arranged at the forward part of the apparatus and that the clutch $c'$ is arranged to be operated by a lever $c^{50}$, which is also arranged at the forward part of the apparatus, so that all of the clutch-levers are within easy reach of the operator who is standing at or near the steering-wheel, hence the apparatus is entirely under his control at all times, yet the entire block-forming and delivering-means is automatically operated, the operator merely determining when to start or to stop them while directing the apparatus over the drying-field.

I claim:—

1. A portable peat delivering apparatus comprising a car running on wheels, a reservoir on said car for the peat, a row of die-openings at the bottom of said reservoir, a plunging-device arranged above said die openings and working in the peat in said reservoir to intermittently force peat through said die-openings in predetermined lengths, a doffing-device to detach the sections of peat from said plunger device at the end of its downstroke and cause them to drop from the apparatus, propelling-mechanism to propel the car by the traction of its wheels operatively connected to the peat-forming and delivering-mechanism, whereby the rows of peat-sections are dropped intermittently at predetermined intervals as the car moves along the field and disconnecting-mechanism to permit the car to be propelled while the forming and delivering-mechanism is idle and a motor carried by said car for operating the propelling and peat-forming and delivering-mechanism, substantially as described.

2. In an apparatus for delivering peat to a drying-field, the combination of a car-body adapted to contain wet peat for delivery having a plurality of die-openings at the bottom, a plunging-device arranged above the die-openings adapted to work in the peat in said body and to force the peat through the die-openings when depressed, and means to reciprocate said plunging-device, substantially as described.

3. In an apparatus for delivering peat to a drying-field, the combination of a car-body adapted to contain a supply of wet peat having an inclined bottom and a compartment at the lower end of said inclined bottom into which the peat is delivered continuously, said compartment having a plurality of die-openings at the bottom, a plunging-device arranged above the die-openings adapted to work in the peat in said body and to force the peat through the die-openings, and means to reciprocate said plunging-device, substantially as described.

4. In an apparatus for delivering peat to a drying-field, the combination of a car-body and propelling-means therefor, said car-body having a plurality of die-openings through which the peat is forced by a plunging-device arranged over said die-openings, the plunging-device and means to move it up and down, and means arranged on the plunging-device to coact with other means on the down-stroke of said device to suddenly detach the sections of peat from said device at the end of its down stroke, substantially as described.

5. In an apparatus for delivering peat to a drying-field, the combination of a car-body and propelling-means therefor, said car-body having a plurality of die-openings through which the peat is forced by a plunging-device, the plunging-device and means to move it up and down, doffers borne by said plunging-device and means to operate said doffers during the last part of the down stroke of the plunging-device to suddenly detach the sections of peat from said device, substantially as described.

6. In an apparatus for delivering peat to a drying-field, the combination of a car-body and propelling-means therefor, said car-body having a plurality of die-openings through which the peat is forced by a plunging-device, the plunging-device, and means to move it up and down, doffers borne by said plunging-device and means to operate said doffers during the last part of the down-stroke of the plunging-device to suddenly detach the sections of peat from said device and to return the doffers to their normal position on the up-stroke of the plunging-device, substantially as described.

7. In an apparatus for delivering peat to a drying-field, the combination of a car-body and propelling-means therefor, said car-body having a plurality of die-openings through which the peat is forced, a plurality of plunger-heads arranged in said body above the die-openings to work in the peat contained in said body and act when depressed to force the peat through the die-openings, means to reciprocate said plunger-heads, and means to detach the blocks from the ends of the plunger-heads operated by and at the end of the down-stroke of said heads, substantially as described.

8. In an apparatus for delivering peat to a drying-field, the combination of a car-body and propelling-means therefor, said car-body having a plurality of die-openings through which the peat is forced in the form of blocks, a plurality of plunger-heads arranged in said body above the die-openings to work in the peat contained in said body and act when depressed to force the peat through the die-openings, means to reciprocate said plunger-heads, doffers connected to the plunger-heads arranged to coact with other means during the last part of the down-stroke of said heads to detach the peat blocks from the ends of the heads, substantially as described.

9. In an apparatus for delivering peat to a drying-field, the combination of a car-body and propelling-means therefor, a plurality of dies through which the peat is forced by power-actuated plungers, in the form of blocks, the power-actuated plungers and pivotally supported doffers to detach the peat blocks having arms, and abutments engaged by said arms on the up and down movements of the plungers to move the doffers on their pivots, substantially as described.

10. In an apparatus for delivering peat to a drying-field, the combination of a car-body and propelling-means therefor, a plurality of dies through which the peat is forced by power-actuated plungers, in the form of blocks, the power-actuated plungers, a pair of doffer-plates, substantially coextensive with the end of each plunger-head and pivotally connected thereto, having arms, and abutments engaged by said arms on the up and down movements of the plunger-head to move the doffer-plates on their pivots and yielding stops for said plates, substantially as described.

11. In an apparatus for delivering peat to a drying-field, the combination of a car-body and propelling-means therefor, a plurality of dies through which the peat is forced by power-actuated plungers in the form of blocks, the power-actuated plungers and a pair of doffer-plates substantially coextensive with the end of each plunger and pivotally connected thereto, and means to move said doffer-plates on their pivots, substantially as described.

12. In an apparatus for delivering peat to a drying-field, the combination of a car-body having a plunger-box, dies and a coöperating plunger-device to force the peat from said box, and a reciprocating feeding-device arranged in said plunger-box movable in a direction toward and from the plunging-device to force the peat into the downward path of movement of said plunger-device, substantially as described.

13. In an apparatus for delivering peat to a drying-field, the combination of a car-body having a plunger-box, and dies and a coöperating plunger-device to force the peat from said box, one wall of said box being movable in a direction toward and from the plunger-device to repeatedly force the peat beneath the plunger-device, and means to move said wall, substantially as described.

In testimony whereof, I have signed my name to this specification, in the presence of two subscribing witnesses.

JAMES MacKAYE.

Witnesses:
B. J. NOYES,
H. B. DAVIS.

Copies of this patent may be obtained for five cents each, by addressing the "Commissioner of Patents, Washington, D. C."